Nov. 28, 1939. A. ARZMAIER 2,181,312
MODULATION SYSTEM
Filed Jan. 8, 1938
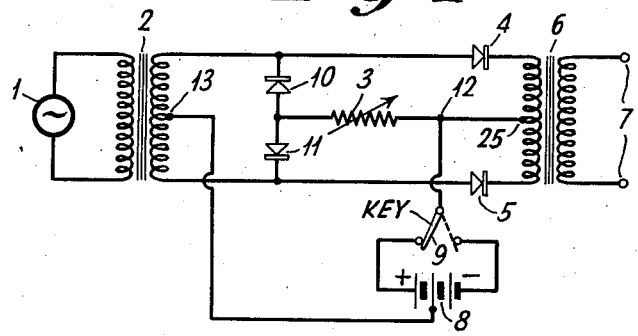
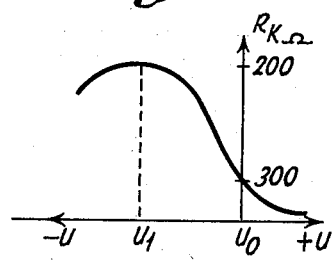
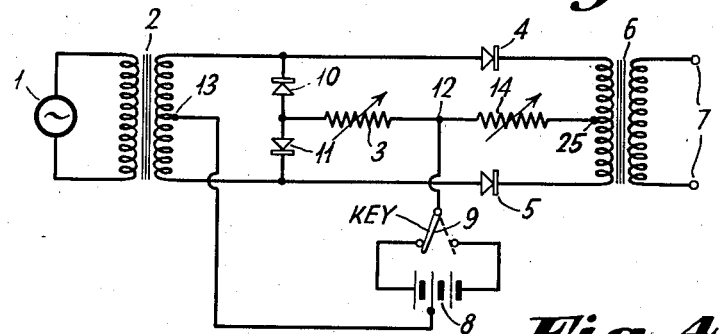
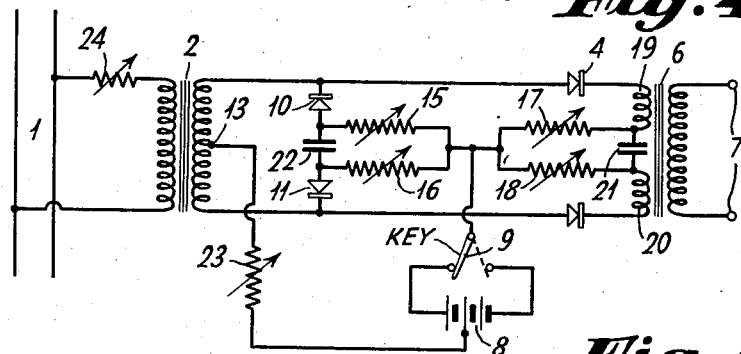
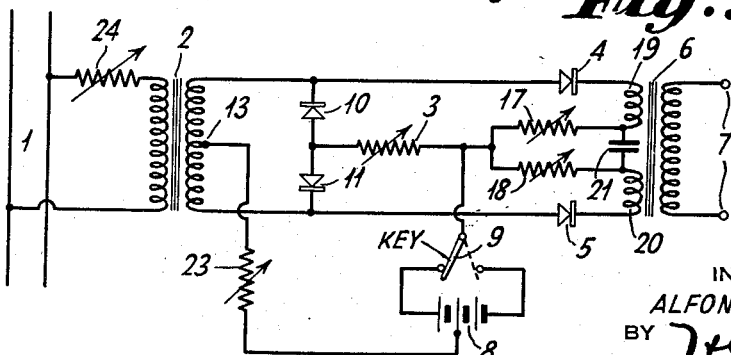
INVENTOR
ALFONS ARZMAIER
BY
ATTORNEY Patented Nov. 28, 1939

2,181,312

UNITED STATES PATENT OFFICE 2,181,312

MODULATING SYSTEM

Alfons Arzmaier, Berlin-Friedenau, Germany, assignor to Siemens & Halske, Aktiengesellschaft, Berlin-Siemensstadt, Germany, a corporation of Germany Application January 8, 1938, Serial No. 183,933
In Germany January 4, 1937

3 Claims. (Cl. 178—66)

This application concerns a new and improved modulator means comprising copper- or oxide-type rectifiers for telegraphy.

In describing my novel modulation means reference will be made to the attached drawing wherein, Fgures 1 and 3 to 5 inclusive, each show different modifications of my modulation circuit, while Figure 2 is a potential resistance curve used to illustrate the operation of the rectifiers in the system.

A telegraphy arrangement is known in the prior art in which alternating currents are subject to control action by oxide- or copper-type rectifiers included in series and in shunt with the modulation circuit, while the control circuit, as shown in Figure 1, contains a variable resistance.

In the circuit organization known in the earlier art, alternating current is fed from the source 1 of alternating current (of tonal frequency) through transformer 2, rectifiers 4 and 5 and output transformer 6 to the output 7. At the same time, according to the position of switch 9, direct current either positive or negative in direction is sent through the rectifier elements by way of the change-over switch 9 which is actuated at the rate or rythym of the telegraphic signals. In addition to the two copper- or oxide-type rectifiers 4 and 5 connected in series and being in differential relationship in reference to the alternating current, there are connected in shunt to the system, two additional rectifiers 10 and 11. These last two rectifiers also are in differential relationship with respect to the alternating current.

In this scheme, the transmission and blocking (forward and backward) directions of the different rectifier elements are so chosen that, with the change-over switch 9 in the position as shown in the drawing, a current is allowed to flow from the positive pole of battery 8 through the branch-off point 12 and the resistance 3 in equal parts through rectifiers 10 and 11 to the midpoint of the secondary winding of the input transformer 2 and thence to the source of current supply 8. In this position of the switch, current is substantially blocked by 4 and 5 so that it does not flow from 12 to 25 and thence to 13. When the switch 9 is shifted over to assume the position indicated by dash lines, a current will be caused to flow from the midpoint of the source of current 8 by way of 13 and in equal parts through the rectifiers 4 and 5 to the midpoint 25 of the primary end of the output transformer 6, and thence by way of 12 to the minus pole of the battery 8.

In this position of the switch current is substantially blocked by 10 and 11 and cannot flow from 13 to 3 and 12 by way of 10 and 11. Inasmuch as the rectifiers when traversed by direct current in the positive direction, exhibit a far lower resistance than when the sense of current flow is inverse, it follows at the rate and rhythm of the telegraphic signals, alternately the rectifiers 4, 5 and 10, 11 will be rendered transmissive for the alternating current of generator 1. In this manner keying of the tone frequency from 1 is accomplished and the keyed alternating current is supplied by 6 to lines 7. The higher the ratio between backward resistance and forward resistance of the various rectifier elements, the more completely will the alternating current coming from the generator 1 be modulated.

Figure 2 shows that the resistance of rectifiers such as 4, 5, 10, and 11 in the blocking or backward direction, in the presence of a negative biasing voltage (—U) is considerably higher than at the instant when no biasing potential ($U_0$) is brought to act upon the said oxide rectifiers. In the presence of $U_1$ the backward resistance attains a crest value; and in the presence of still higher values of the negative biasing potential, the backward resistance decreases again.

Now, according to the present invention, in order to improve the circuit organization known in the prior art and as illustrated in Figure 1, I coordinate preferably a regulable resistance 13 and 14, respectively, to each pair of rectifiers, as shown in Figure 3. Moreover, in my system each such additional adjustable resistance is so dimensioned that the resistance in the backward or blocking direction of the parallel connected rectifier pair is thus raised by virtue of the dimensions of the adjustable resistances. In the case of rectifiers having characteristic of a shape similar to that shown in Figure 2, this means that the negative biasing potential resulting from the potential drop in the circuits including the regulable resistances lies between the values $U_0$ and $U_1$, but that it should not exceed these limits. For example, if 9 is in the dotted position and a current is flowing from the battery 8 by way of branch-off point 13, rectifier 4, and resistance 14 and point 12, and thence back to the said battery, then the drop of potential occasioned at the rectifier 4 and across the resistance 14 applied across rectifier 10 acts like a blocking potential for the oxide rectifier 10. The same situation holds good for the rectifier 11 in reference to the fall of potential occurring across rectifier 5 and resistance 14. Thus, the shunting effect of 10 and 11 is reduced considerably and the degree of modulation of the keyed alternating current correspondingly increased.

It is of particularly great advantage to so dimension the resistances 3 and 14, according to another object of this invention, that the fall of potential caused across the said resistances and the corresponding rectifiers will correspond to the particular value of the negative biasing potential at which the backward resistance attains its maximum magnitude ($U_1$ in Figure 1).

A further improvement in an arrangement of this kind is attainable by dividing each of the resistances 3 and 14 into two single resistances 15, 16 and 17, 18, respectively, as illustrated in Figure 4. For it will be understood that, under practical conditions, it is not always feasible to make conditions so that the characteristics and thus the resistance at the working points of the various oxide-type rectifiers will be perfectly balanced or aligned. However, by subdividing the resistances coordinated to the various rectifier pairs into smaller elements according to the invention it is possible to select for each rectifier an optimal value of biasing potential, regardless of such departures or discrepancies in the characteristics as may be present.

The subdivision of the resistances coordinated to the various pairs of rectifiers as here suggested offers this additional advantage and merit that resistances 17 and 18 may be so set that the magnetic potential or circulation due to control current in the two portions 19 and 20 of the output transformer will be exactly equal and opposite so that by convenient setting of the resistances 17 and 18 all lack of symmetry liable to be occasioned as a result of dissimilarities in the oxide rectifiers 4 and 5, or as a consequence of differences in the two halves 19 and 20 of the winding, will be compensated and neutralized. To be sure, if the adjustment of the resistances 17 and 18 is effected from a viewpoint of symmetry and alignment it will not always be possible to obtain the optimum value for the blocking potential for both pairs of rectifiers; yet, it will be possible to adjust conditions close to the optimal value of the said potential, without any serious disadvantages being occasioned incidentally. To insure as close as possible a symmetry in the circulation through resistances 17 and 18 is of great importance since otherwise, upon disappearance of the control direct current flow, a residual direct current component would remain in the output transformer 6 for each pulse of current; and the sudden disappearance of the same occasioned upon interruption or reversal of direction of the control current would set up a shock of current in the output circuit 7, with the result that current impulses are caused which are not intended to be transmitted.

Thus, according to a still further object of the invention it is suitable to shunt or bridge resistances 17 and 18, and 15 and 16, by condensers 21 and 22 for alternating current. In this manner alternating current dissipation through resistances 17, 18 and 15, 16, respectively, will be avoided, while the relation between forward resistance and backward resistance for alternating current is greatly increased. In this scheme, condenser 21 becomes of particularly great importance inasmuch as it acts upon the impedance in the forward direction of the rectifiers and thus on the maximum amplitude which is transmitted, while condenser 22 is of lesser importance inasmuch as it merely serves to diminish the alternating current in the backward sense. This condition applies for low generator resistance, that is to say, constant terminal potential. In the presence of constant circulation (that is to say, in the presence of high inner resistance of the generator) the situation is reversed.

It is probable that a circuit organization of the kind illustrated in Figure 5 is of particularly great practical importance and value. In this scheme, only resistance 14 is divided into two subdivisional resistances 17 and 18, and these are shunted by the condenser 21. Resistance 3, on the contrary, has not been split, though it is so proportioned that for the rectifiers 4 and 5 a blocking potential as favorable as feasible is obtained.

According to a further object of this invention the maximum load of the copper or oxide type rectifiers by the control direct current is regulated by a distinct resistance 23 (Figures 4 and 5) which is provided outside the rectifier bridge arrangement rather than by resistance 3 as in the case of Figure 1. As a result the control current loads of all rectifiers are regulated in the same measure, while the regulation of the control current will be unaffected by the dimensions of resistances 15, 18, in fact, the setting of the latter need to be guided only by the viewpoint of insuring optimum biasing potential and symmetry in the circulation of control direct current in the output transformer.

Adjustment of the alternating current amplitude ahead of the input transformer is effected by the variable resistance 24. This resistance has a high ohm valve seeing that as a general rule a plurality of telegraph instruments are connected in parallel relation to one and the same generator so that it becomes necessary to preclude all chances of mutual interference between these apparatus through the joint source of current supply 1.

Circuit organizations of the kind here disclosed, in contrast to arrangements known in the earlier art such as shown in Figure 1, moreover, offer the advantage that all of the rectifier elements are practically subjected to the same maximum voltage, whereas in the earlier scheme the rectifiers 4, 5 are subject to a considerably higher voltage than the rectifiers 10 and 11. As a result, the rectifier elements may be utilized more advantageously, and the working life thereof is extended appreciably.

I claim:

1. In a modulator arrangement for alternating current telegraphy in which the alternating current impedance of two pairs of dry or oxide type rectifiers are connected, one pair in series and the other pair in shunt with the alternating current circuit to be controlled a source of direct current connected in direct current circuits with said rectifiers by polarity reversing keying means so that the direct current polarity may be reversed at the rhythm of the signals to control the conductivity of the rectifiers at the rhythm of the signals, and an additional resistance connected in series with each pair of rectifiers, the dimensions of said additional resistances being so chosen that the control potential arising across the series pair of rectifiers and its additional resistance, in the forward direction of the rectifiers, will tend to raise the blocking potential on the shunt pair of rectifiers to a value at which said shunt pair of rectifiers are of maximum impedance.

2. In a modulator arrangement of alternating current telegraphy in which the alternating current impedance of two pairs of dry or oxide type rectifiers are connected, one pair in series and the other pair in shunt with the alternating current circuit to be controlled, a source of direct current connected in direct current circuits with said rectifier by polarity reversing keying means so that the direct current polarity may be reversed at the rhythm of the signals to control the conductivity of the rectifiers at the rhythm of the signals, an additional resistance connected in series with each pair of rectifiers, the dimensions of said additional resistances being so chosen that the control potential arising across the series pair of rectifiers and its additional resistance in the forward direction of the rectifiers, will tend to raise the blocking potential on the shunt pair of rectifiers, and a condenser for by-passing alternating currents in shunt to each of the additional resistances.

3. In a tone keying system, a circuit having an input reactance and an output reactance connected in series by a pair of rectifiers substantially symmetrically arranged in said connections, a second pair of rectifiers connected in opposition in shunt to said connections, a source of direct current, a key and pairs of contacts for connecting said source of direct current between symmetrical points on said output reactance and said shunt connection and a point of symmetry on said input reactance and for reversing the polarity of said source of potential in said connection to increase and decrease respectively, the impedance of said series rectifiers and said shunt rectifiers and vice versa, a resistance in series with said source of direct current in one position of said switch, the value of said resistance being such as to produce across one of said pairs of rectifiers, a blocking potential which makes its blocking impedance substantially maximum, a condenser for by-passing alternating current in shunt to said resistance, and means for impressing alternating current to be keyed on said input reactance.

ALFONS ARZMAIER.